(No Model.) 4 Sheets—Sheet 1.

C. E. DAVIS.
SYSTEM OF CIRCUIT CONTROL FOR ELECTRIC MACHINES.

No. 520,822. Patented June 5, 1894.

WITNESSES.
D. M. Carter
Walter J. Gunthorp

INVENTOR.
Charles E. Davis
by Francis W. Parker,
Atty

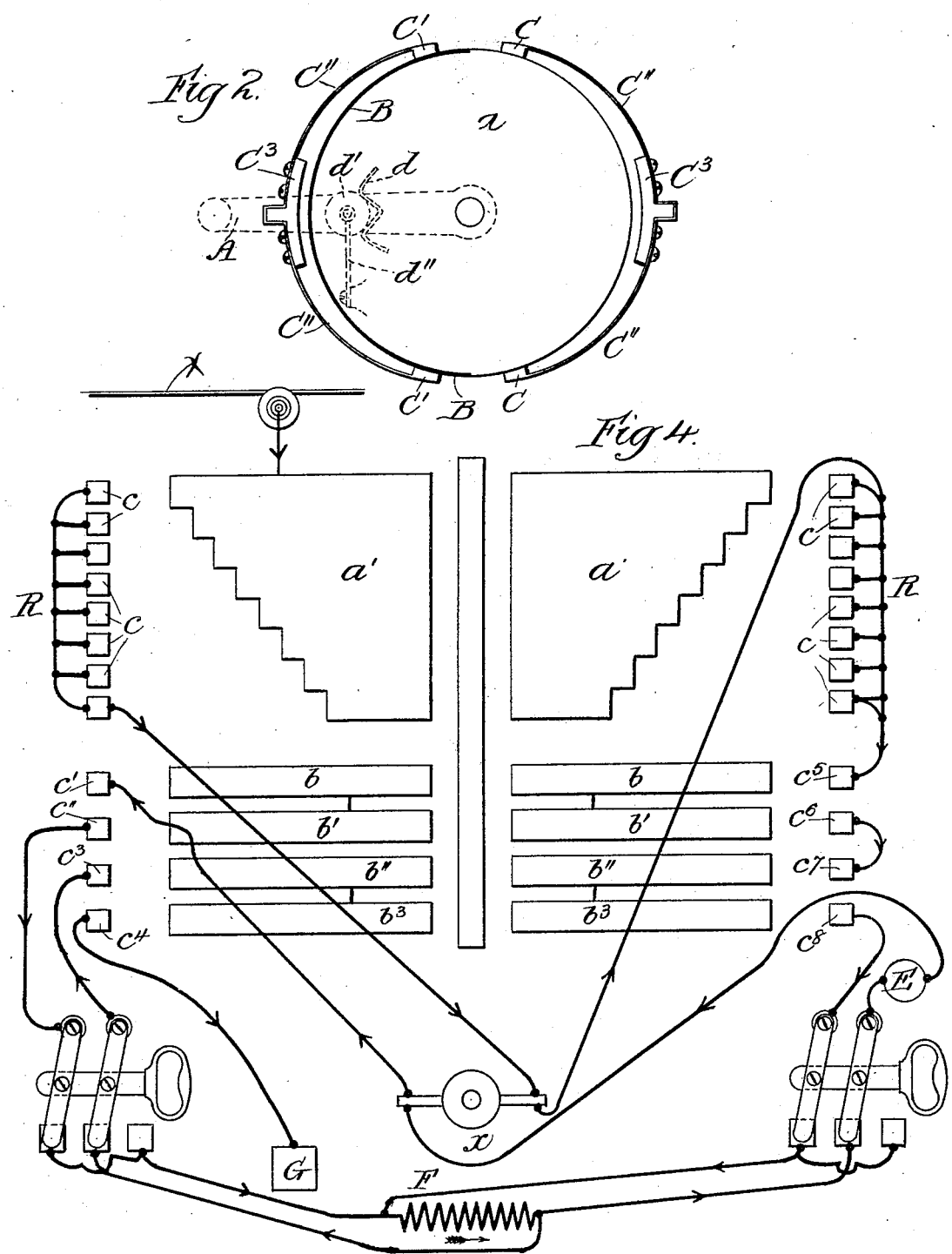

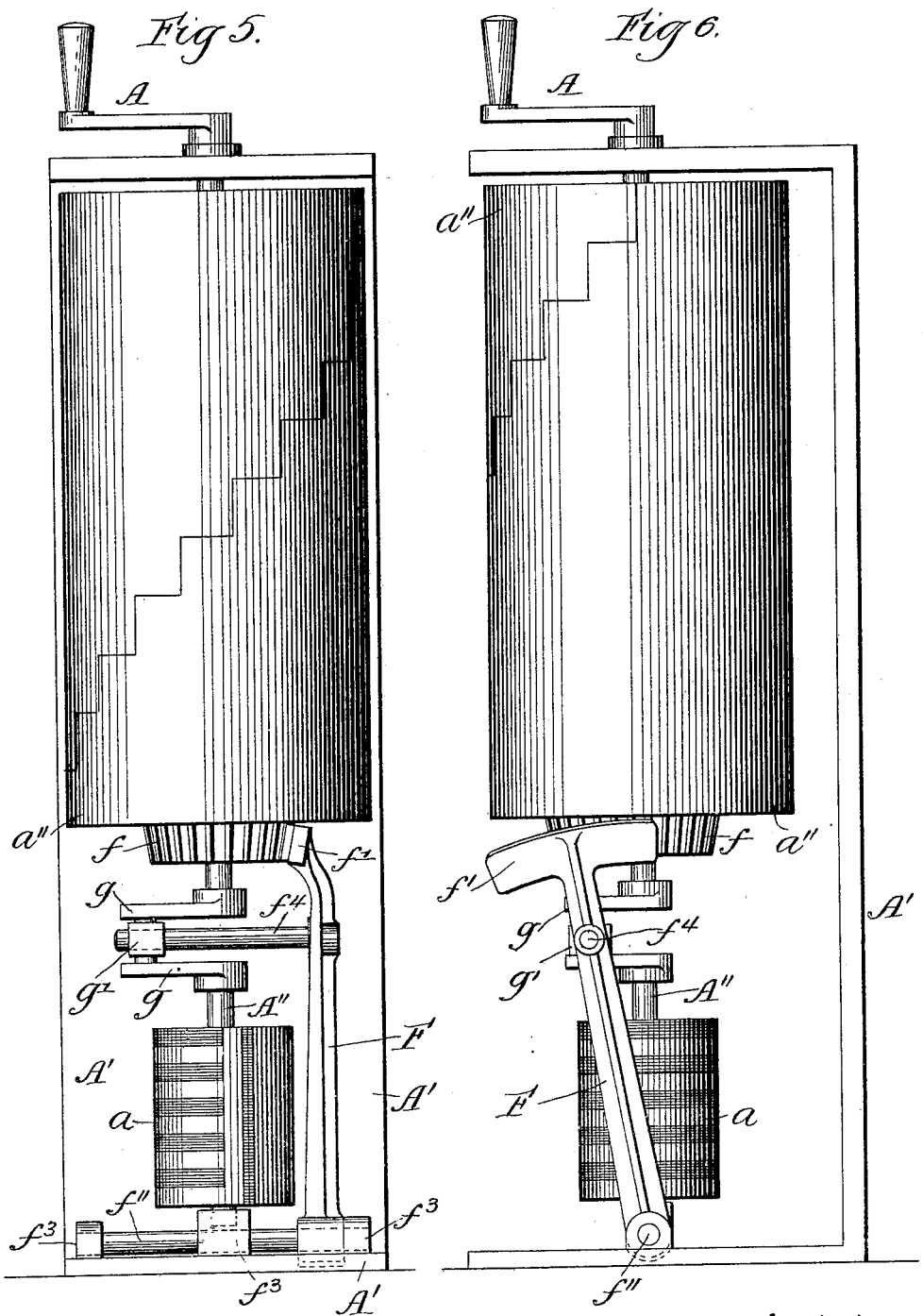

(No Model.) 4 Sheets—Sheet 4.
C. E. DAVIS.
SYSTEM OF CIRCUIT CONTROL FOR ELECTRIC MACHINES.
No. 520,822. Patented June 5, 1894.
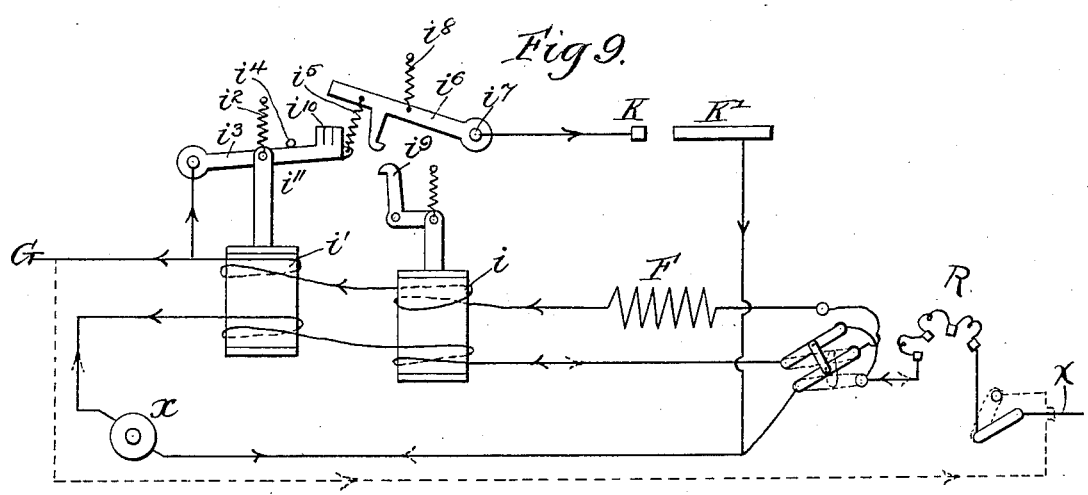
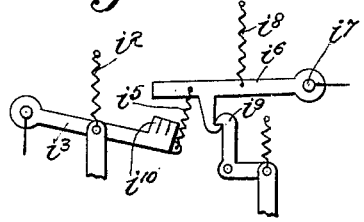
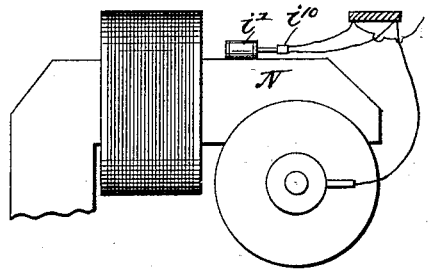
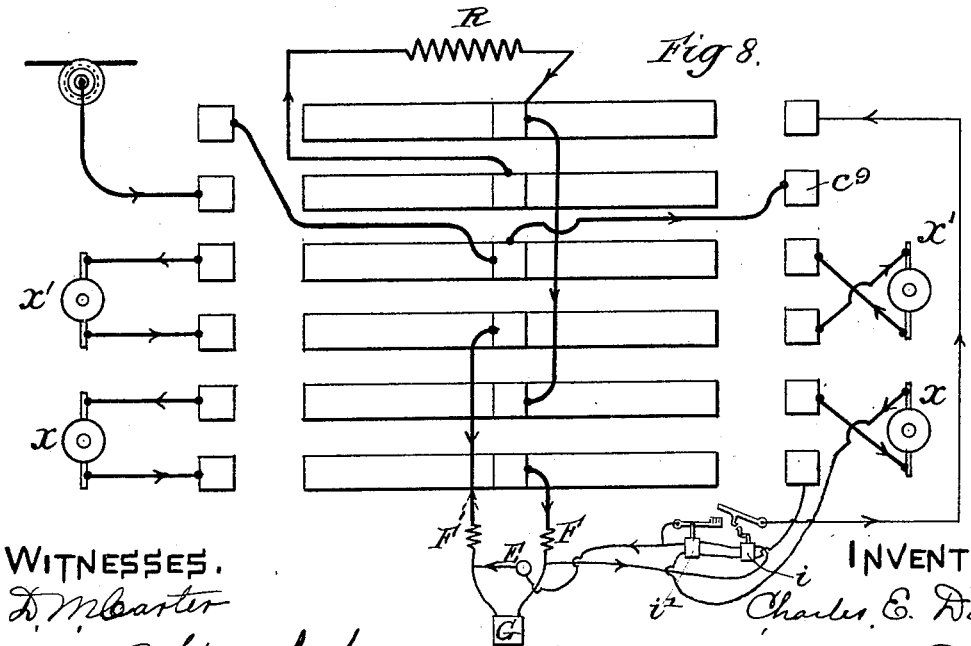
WITNESSES. INVENTOR.
D. M. Carter Charles E. Davis
Hattie J. Gunthorp by Francis W. Parker
Atty

UNITED STATES PATENT OFFICE.

CHARLES E. DAVIS, OF CHICAGO, ILLINOIS, ASSIGNOR TO JOHN H. LESLIE, OF SAME PLACE.

SYSTEM OF CIRCUIT CONTROL FOR ELECTRIC MACHINES.

SPECIFICATION forming part of Letters Patent No. 520,822, dated June 5, 1894.

Application filed October 16, 1893. Serial No. 488,282. (No model.)

*To all whom it may concern:*

Be it known that I, CHARLES E. DAVIS, a citizen of the United States, residing at Chicago, county of Cook, and State of Illinois, have invented a new and useful Improvement in Systems of Circuit Control for Electric Machines, of which the following is a specification.

My invention relates to electric starting devices for an electric motor or motors, and consists in combining therewith mechanism whereby said starting device may be also used to govern or control the current entering the motor at the same time being combined with devices which automatically turn the motors, or one of them, into a generator whereby current is produced at the expense of mechanical energy which, being consumed, causes retardation and final stopping of the motor or motors and connected machinery.

It also consists of sundry details which render the construction of the apparatus more effective and economical. These are described in the following specification and particularly pointed out in the claims, being at the same time illustrated in the accompanying drawings, in which—

Figure 7:
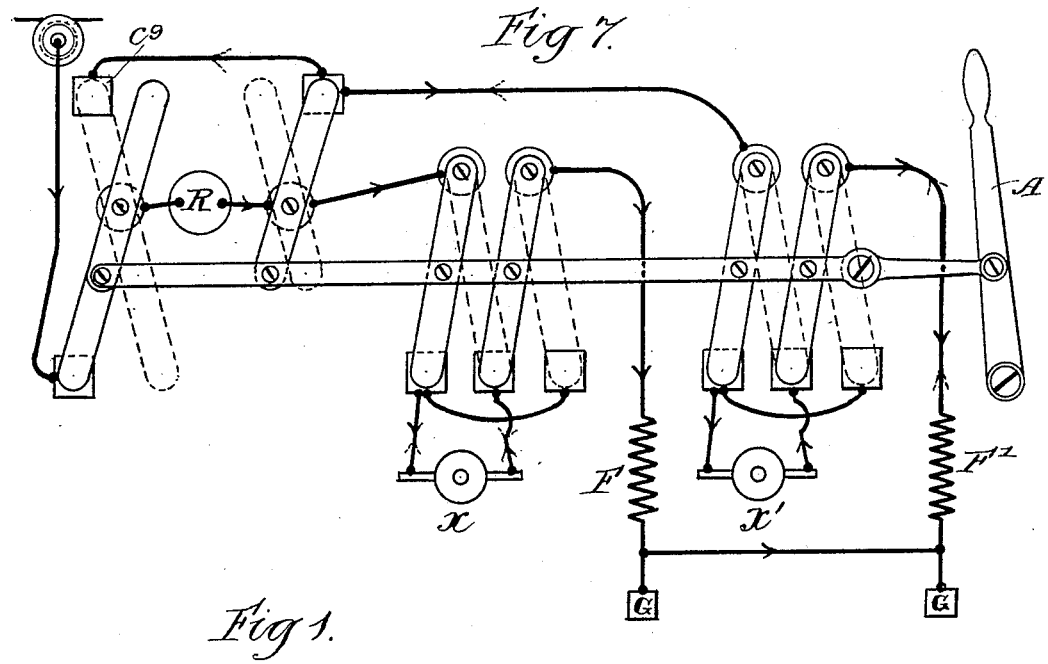
Figure 1:
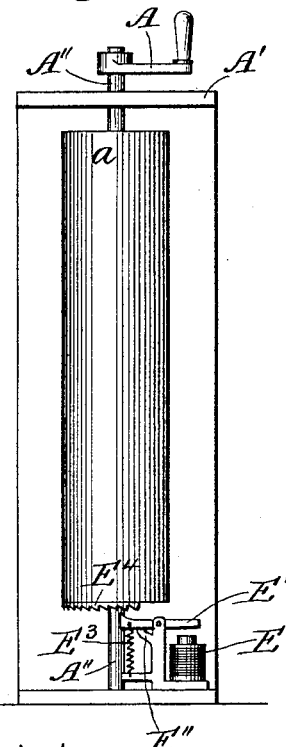
Figure 3:
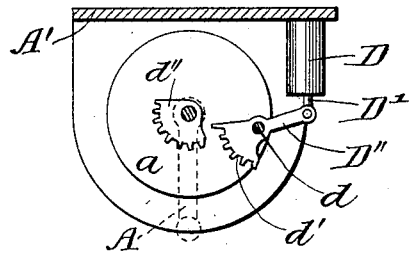
Figure 3A:
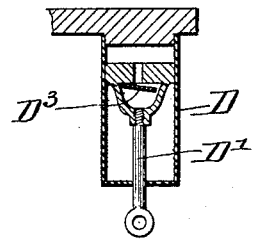

Figure 1 represents a diagrammatic view of the starting device in its simpler form showing also automatic catch. Fig. 2 shows a section of the roller or drum. Fig. 3 shows a plan of same, also illustrating the retarding device. Fig. 3ᴬ represents a detail of plunger with dash pot shown in Fig. 3. Fig. 4 represents a diagrammatic view of the controller and its connections to the motor. Fig. 5 shows a front elevation of a varied form of the controller, involving a separate rheostat drum with a handle standing in one-quarter position. Fig. 6 is a side elevation of same, showing handle in a central, mid or off position. Figs. 7 and 8 show diagrammatic views of the connections of the controller when two motors are used. Figs. 9, 10, and 11, show diagrammatic views of the temporary short-circuiting device for the motors or one of them and its relative location upon same.

Similar letters of reference indicate like parts throughout the several views.

Let A represent the ordinary controlling handle which in its off position stands as shown in Figs. 3 and 6.

Let A' be the box or case in which the drum $a$ is located and journaled by the shaft A". Secured to the drum $a$ are the circular contacts $b$ operating in conjunction with the stationary contacts C, the circuit connection being established by auxiliary contacts C', these contacts being connected by springs C" which in turn are mounted on stationary portions $C^3$ of the frame work of the box, the object being to allow of a very large circular movement involving nearly the entire circumference of the circle. The middle or off position is shown by A in Fig. 2; thence it may be moved in either direction, one direction being to supply current from an extraneous source, such as the trolley wire, to the motor or motors; the other direction being to so change the connections and possibly eliminate the supply connection that the motors, or one of them, will be transformed into a generator thereby abstracting power from the connected machinery. To facilitate the holding of the drum $a$ in its middle position, and also to facilitate the accurate placing of same and keeping it from going too far in either direction I provide a mechanical stop which, though stopping the drum in exactly the center of its revolution, does not prevent it from being moved from that position in either direction. Any of the well known devices may be used for this purpose; I prefer the one shown in diagram in this figure (Fig. 2) consisting in the notch $d$, roller $d'$ and spring $d''$. When turning in one direction, preferably the one in which the motors are made to generate current, it is not well to have the movement of the drum too free for fear of over-application of the electric brake, allowing the generator to produce too much current, tending to overheat same. This I prevent by placing a device which will retard the action of the drum $a$ when in its brake region, shown by a dash pot D provided with plunger D' and lever D" to which the plunger is attached, same being fulcrumed at $d'$ and also provided with a toothed segment $c'$ co-operating with a corresponding toothed segment $d''$ secured to the drum. Fig. 3ᴬ illustrates the construction of the plunger D′ showing a valve D³ by means of which the plunger may be made to move one way with freedom.

Even with the retarding device just described it is found that sometimes it is possible to over-apply the brake, in which case I provide a device shown at the bottom of Fig. 1 whereby such over-application is rendered impossible, consisting in the magnet E with the armature E′ and provided with a stop E″ and retracting spring E³. The opposite end of the armature E′ is beveled and forms a dog which co-operates with the teeth E⁴, which teeth are located on a portion only of the circumference of the drum $a$, being in such a position that when such drum is in its brake region, as shown in the figure, the teeth are in proximity to the dog and upon an overcharge of current through the magnet E the same will retract its armature and entirely prevent further rotation of the drum until the current intensity has sufficiently subsided to allow the retracting spring E³ to withdraw it from engagement with the teeth E⁴. As indicated in Fig. 4 when compelling the drum $a$ to operate in both directions it is found necessary to duplicate the portion which gradually removes the resistance indicated in this figure as $a'$, together with all the co-operating contacts indicated at $c$, $c$, &c., the resistance in the circuit being represented by R. To obviate the necessity of this duplication I have devised means shown in Figs. 5 and 6 whereby the handle A and shaft A″ are provided with two drums, the drum $a$ below being rigid upon the shaft and the larger drum $a''$ above being loose upon the shaft A″, and provided at its lower extremity with a bevel pinion $f$ co-operating with a bevel rack $f'$ mounted on a lever F and pivoted at the lower part of the case A′ upon the shaft $f''$ journaled in ears shown at $f^3, f^3, f^3$, the shaft A″ stopping above the shaft $f''$ as shown in Fig. 5. The shaft A″ is provided with a crank or cam $g$ co-operating with a long pin $f^4$ protruding from the lateral face of the lever F. This pin is locked by the universal joint or block $g'$ so that the motion of the cam or crank pin $g$ is imparted to the said block $g'$ and in turn imparts its motion, swinging about the center of the shaft $f''$, to the pin $f^4$ as it moves in either direction from its middle position shown in Fig. 6, the block at the same time sliding back and forth from about the center of the pin $f^4$, being shown in this position in Fig. 6 and in its extreme position in one direction in Fig. 5, in which position it will be readily understood to have moved the lever F to its central or upright position and therefore to have revolved the drum $a''$ through one-quarter more or less of its total movement in one direction, being in fact the direction in which the above drum moves during application of current from the extraneous source to the machine when used as a motor.

Referring now to the mechanism shown in Figs. 9, 10, and 11, it will readily be understood that when the circuits of the motor are so changed that its rotation will produce a current the relative connections of its armature and field and the direction of the passage of current therethrough will have been changed or reversed. I utilize this fact or law to operate a device which temporarily short-circuits the motor after it has been converted into a generator to aid in the quicker building up of its field. I have found that this action is almost instantaneous when so short-circuited, but when a large amount of resistance is in the circuit the building up of the field is very much slower, and in some instances too slow to derive the full benefit in its operation. The alternate use of the machine as a generator and motor is contemplated in the action of this device.

In Fig. 9 let $i$ and $i'$ indicate two compound-wound electro-magnets or solenoids, one of the circuits being that of the field F of the motor, the other being the circuit of the armature 10. The connections are such that when the machine is used as a motor the direction of the current is shown by the arrows in full lines, and when the machine is used as a generator the direction of the current is indicated by the dotted arrows, a suitable reversing switch being shown in the figure. In the former instance it will be seen that the direction of the currents is opposite in the windings of solenoid $i$, and hence neutralize each other, leaving this solenoid inactive. The currents in the solenoid $i'$ are both alike, rendering it active, drawing down its core $i''$ against its lifting spring $i^2$ and attached lever $i^3$, fulcrumed as shown, from the stop $i^4$, and by means of a flexible cord $i^5$, preferably of insulating material, also withdrawing the lever $i^6$, swinging on its fulcrum $i^7$ against its retractile spring $i^8$, into the relative position shown in Fig. 10, in which the hooks shown at $i^9$ interlock being held in their interlocked position by the retractile spring shown in both figures. It will now be readily understood that when the current ceases to flow in the motor the said spring $i^2$ will again lift its lever into its former position against the stop $i^4$ in which position electrical contact or communication will be established between the two levers $i^3$ and $i^6$ by means of the split contact indicated at $i^{10}$. In this position they remain at rest until the current again circulates through the machine. Let us suppose that in this instance the current circulates through the machine "motorwise," the two levers $i^3$ and $i^6$ will now again assume the position shown in Fig. 10 and upon the current again ceasing, electrical contact between these levers will be re-established. Let us now suppose that the current circulates through the machine, which is at the time a generator, in this instance the switches will be in the position shown in dotted lines and the current will traverse the armature as indicated by the dotted arrows in which case the magnet or solenoid $i'$ will become inactive, and the magnet or solenoid $i$ will become active drawing against its spring until the hook $i^9$ has disengaged itself from the lever $i^6$ leaving same free to fly quickly upward under the tension of the spring $i^8$ until stopped as by the flexible connection $i^5$, thus breaking the electrical connection between the two levers. One of these levers is connected with auxiliary contacts $k$ and $k'$ upon the drum $a$ and is always open while the machine is used as a motor, being closed again at the instant the machine is rendered a generator, so that the closure of the electrical contact between the levers $i^3$ and $i^6$ is of no avail and inactive until the drum $a$ is turned in the direction in which the machine becomes a generator, whereupon the circuit is closed between $k$ and $k'$ which allows the machine to generate a current upon a short circuit through the magnets $i$ and $i'$, levers $i^3$ and $i^6$, contacts $k$ and $k'$ and connecting wires, and upon the increase of current up to a predetermined point this circuit is automatically broken, the current continuing to flow out through the controlling resistance, other devices, motor if there be one, &c., as will be hereinafter specified. The preferred location of the device in respect to the motor is shown in Fig. 11, the location being such that the lines of force (a magnet for instance from the magnet N of the motor or dynamo) will tend to rupture the arc formed between the contact $i^{10}$ and the lever $i^6$.

It will be understood that when the connections are made as herein described, and after the connections of both motors are altered so that they will both tend to generate a current, it is difficult to know which will preponderate the other in electro-motive-force and the constant opposition of the starting electro-motive-forces retards the general action. The device located upon one of the motors localizes the generation as between the two and eliminates almost entirely the time element, its action being almost instantaneous. This latter feature is also true when only one motor or electric machine is used. It being one of the primary objects of the invention to transform or convert the electrical machinery which is connected to the circuit controller from a motor, with its connections to the source of supply, into a generator with or without such connection by the simple turning of a handle in either direction from a central or middle position of rest, it will readily be understood that the particular connections which obtain as between such circuit controller and the motor or motors are immaterial to the invention, especially the particular circuit connections which obtain when circuit connections are complete and connected to the source of electrical supply. For instance, when acting as motors the machinery or motors which the electrical controller supplies, may be either coupled in series or in multiple, or successively in both relations, or the machinery may consist in one motor with two armatures or a single armature with two windings which are respectively coupled in series and multiple, it simply being important to the present invention that by the moving or turning of the handle the circuit relations are such that they are respectively transformed from motors into generators, or at least one of such machines (provided there are more than one) be so transformed, and the currents so generated are led through a controlling resistance together with other devices which are preferably handled by the same handle, so that starting with the middle position the farther such handle is turned the more of such resistance is cut in or out, preferably the latter. In this regard it may be pointed out that it is not necessary that the controlling handle above referred to should be connected with a rotating shaft, but the electrical contacts may be placed upon a sliding block or a swinging arm and the handle may simply vibrate back and forth in either direction from its central position or region of movement.

The contacts operating upon the drum $a''$ will be readily understood by former reference to the upper half of the diagram in Fig. 4. The circuit connections will now be more fully described, when either one or two motors are employed, and may be pointed out as follows.

Referring to Fig. 4 let X represent the armature and F the field. Suppose now the drum be turned in the direction applying current from an extraneous source to the motor and the direction indicated by the arrows, the current would flow from the trolley partially through the contacts $c$ and $a'$ and partially through resistance R to the right-hand brush, through the armature, out of the left hand brush, to contact $c'$, into contact plate $b$, to contact $b'$ by internal connection, then to contact $c''$ and by wire to reversing switch, thence through field F in the direction of the arrow, returning to the reversing switch and to contact $c^3$, to the plates $b''$ and $b^3$, to contact $c^4$ and to the ground G. The direction traversed by the current through the field will be determined by the position of the reversing switch as will be readily understood. For convenience the reversing switch and resistance R are duplicated in the drawings but in practice this is not found necessary. Let us suppose now that the drum is turned in the opposite direction. Here we will see that the trolley contacts $c$ and $a'$ to the left are inactive. Supposing now that the machine generates and that the current flows through the field in the same direction as before, by following the arrows it will be seen to pass through the reversing switch, thence through the magnet E for the purposes above referred to, thence into the left hand brush through the armature, out of the right hand brush through the resistance or contact $a'$, thence by contacts $c^5$, $c^6$, &c., and plates $b$, $b'$, &c., to contact $c^8$, thence by reversing switch to the field F by the connections indicated, current flowing also in the direction indicated by the arrows. In this instance the current will be seen to have traveled in opposite direction through the armature, the wires passing to the left from both armature and field being open-circuited and inactive. The connections of the drum $a$ in Figs. 5 and 6 are represented in Figs. 7 and 8, the opportunity being taken to also illustrate the connections where two motors are used, it being readily understood that in this case both may be treated as a single motor in exactly the same manner as last above described, but it is preferred that one of the motors act as a generator and the current so generated be conducted through the other motor which at the same time is so changed as to circuit relations that it will tend to oppose the motion of its armature or other moving part thereby utilizing the currents flowing through the system in a two-fold manner, and at the same time require but a very small resistance at R.

Fig. 7 is an ultra-diagrammatic view for the purpose of rendering the circuits more easily traceable. Suppose now the handle A being turned to the left, shown in its position in Fig. 5, the connections are supposed to be as indicated in full lines in Fig. 7 wherein the current will flow from the trolley through the resistance where it will divide, passing through each of the motors as indicated by the arrows in full lines, whereupon if the handle A be turned to the right the connections will be indicated by the switch arms in their position shown in dotted lines, in which case the motors are coupled in series including the controlling resistance R, the connections to the extraneous source of supply being broken and the current will flow in the same direction through the field F, in opposite direction through the field F' and in the same direction as before through its armature X', as indicated by the full arrows at this point; thence to contact plate $c^9$ and resistance R, right hand brush of armature X, through the armature in opposite direction to the current heretofore as indicated by the dotted arrows, thence to the field F which was the starting point. These connections are also shown in Fig. 8 in their true relation to the drum $a$ with the addition of the complete connection of the temporary short-circuiting device described and shown in Figs. 9 and 10, the circuits being easily traced as last above described by the direction of the arrows. The addition of the controlling resistance R to the device described whereby the full control of the application of the brake is permitted while employing only one of the motors as a generator is one of especial value and utility.

It will readily be understood that the windings on the coils $i$ and $i'$ may be coupled in shunt of the armature and field circuit as well as in series, or these wires may constitute a combination of series and multiple of each branch and yet fulfill the functions above referred to, or each magnet such as $i'$ might be replaced by two separate magnets pulling at the opposite ends of the core or the opposite ends of the walking beam or lever, constituting thereby a system of magnets representing the two windings the ultimate effect of which would be the same as of those herein described. I do not therefore care to limit myself to the particular coupling herein shown.

The use and operation of the devices have been pointed out in the description, and require therefore no separate treatment.

It will be observed that certain devices such as switches, connections, &c., have been omitted in the circuits at various places for the sake of simplicity and clearness, their use being generally understood by those versed in the art to which this invention appertains.

What I claim as new, and desire to secure by Letters Patent, is—

1. The method of variably retarding or checking the motion of motors normally coupled to the feed circuit in pairs, together with a variable resistance for the operation of such motors; consisting in breaking the supply circuit, connecting the motors in series on a local circuit including said variable resistance, and then causing said resistance to be regulated to suit the requirements regulating or varying said retardation.

2. The method of variably checking the motion of motors normally coupled to the feed circuit in pairs, together with a variable resistance for the operation of such motors; consisting in breaking the supply circuit, connecting the motors in series on a local circuit, the coupling being such that the electro-motive-forces of the two motors acting through said variable resistance though unequal are normally opposed to each other, said local circuit including said variable resistance and regulating such resistance to vary the said checking of the motion.

3. The method of arresting or checking the motion of motors normally coupled to the feed circuit in pairs, consisting in breaking the supply circuit, connecting the motors in series with each other, and closing a short-circuiting device around one of the motors.

4. The method of arresting or checking the motion of motors normally coupled to the feed circuit in pairs, consisting in breaking the supply circuit, connecting the motors in series with each other, closing a short circuit upon one of the motors, and causing the said short circuit to be automatically opened by an electric current.

5. The method of arresting or checking the motion of motors normally coupled to the feed circuit in pairs, consisting in breaking the supply circuit, connecting the motors in series with each other, closing a short circuit upon one of the motors, and causing the said short circuit to be automatically opened by the electric current within such short circuit.

6. The method of variably retarding or checking the motion of motors normally coupled to the feed circuit in pairs, together with a variable resistance for the operation of such motors; consisting in breaking the supply circuit and connecting the motors in series on a local circuit including said variable resistance, the coupling being such that the electro-motive-forces of the two motors acting through the variable resistance though unequal are normally opposed to each other, and coupling to one of the motors a device for automatically causing such motor to preponderate the other as to electro-motive-force.

7. In a controller for electric motors, two series of contacts separated by a space, and cooperating contacts, one set being mounted on a main moving element of the controller and organized for movement relative to the other set or sets, a supply circuit for the motor leading to the controller, and an independent local circuit also leading to the controller, connections between a single set of said contacts and the sections of an artificial resistance and also between others of said contacts and the motor or motors such that when the said moving element is in a central position the contacts are open-circuited, when in a position to one side of said central position the supply circuit is operatively coupled to the motor through said single set of contacts and connected resistance and when in a position on the other side of said central position the motor is disconnected from the said supply circuit, and its circuit is completed through the said local circuit and also through said single set of contacts and connected resistance.

8. In a controller for electric motors, two series of contacts separated by a space, and cooperating contacts, one set being mounted on a main moving element of the controller and organized for movement relative to the other set or sets, a supply circuit for the motor leading to the controller, and an independent local circuit also leading to the controller, connections between the said contacts and the motor or motors such that when the said moving element is in a central position the contacts are open-circuited, when in a position to one side of said central position the supply circuit is operatively coupled to the motor and when in a position on the other side of said central position the motor is disconnected from the said supply circuit and the circuit is completed through the said local circuit, in combination with an electrically operated device as a brake adapted to be thrown into and out of action by the operation of said controller, the same being included in the said local circuit.

9. In a controller for electric motors, two series of contacts separated by a space, and cooperating contacts, one set being mounted on a main moving element of the controller and organized for movement relative to the other set or sets, a supply circuit for the motor leading to the controller, and an independent local circuit also leading to the controller, connections between the said contacts and the motor or motors such that when the said moving element is in a central position the contacts are open-circuited, when in a position to one side of said central position the supply circuit is operatively coupled to the motor and when in a position on the other side of said central position the motor is disconnected from the said supply circuit and the circuit is completed through the said local circuit, in combination with an electrically operated device in the said local circuit for affecting the movements of said moving element.

10. In a controller for electric motors, two series of contacts separated by a space, and cooperating contacts, one set being mounted on a main moving element of the controller and organized for movement relative to the other set or sets, a supply circuit for the motor leading to the controller and an independent local circuit also leading to the controller, connections between a single set only of said contacts and the sections of an artificial resistance, and also to the motor or motors such that when the said moving element is in a central position the contacts are open-circuited, when in a position to one side of said central position the supply circuit is operatively coupled to the motor and when in a position on the other side of said central position the motor is disconnected from the said supply circuit and the circuit is completed through the said local circuit, in combination with means connected with said moving element for including more or less of said sections within said local circuit through said single set of contacts.

11. In a controller for electric motors, two series of contacts separated by a space, and cooperating contacts, one set being mounted on a main moving element of the controller and organized for movement relative to the other set or sets, a supply circuit for the motor leading to the controller, and an independent local circuit also leading to the controller, connections between the said contacts and the sections of an artificial resistance, and also to the motor or motors such that when the said moving element is in a central position the contacts are open-circuited, when in a position to one side of said central position the supply circuit is operatively coupled to the motor and when in a position on the other side of said central position the motor is disconnected from the said supply circuit and the circuit is completed through the said local circuit, a temporary short circuit around the artificial resistance, in combination with means for automatically opening the short circuit.

12. In an electric controller, a revoluble shaft, a set of moving contacts mounted upon a drum surrounding such shaft organized to move to and fro over the same region, in combination with connecting mechanism whereby said contacts are caused to make the said to and fro movement by the revolution of the shaft in either direction from a central or mid position of rest.

13. In an electric controller, a shaft capable of but a single revolution or fraction thereof, two drums moved thereby, connecting mechanism whereby one drum is solid on the shaft, and connecting mechanism whereby the other drum reverses its motion at or about the central point in the revolution of the shaft.

14. In an electric controller, a shaft capable of but a single revolution or fraction thereof, two sets of electric contacts operated by said shaft, one moving with the shaft and the other reversing its direction of motion at or about the central point in the rotation of the shaft and mechanical connection from the shaft to the last named set of contacts.

15. An electric machine alternately operated as a motor and generator having two or more circuits, means for varying the connections or circuit relations so as to change the machine from one to the other, in combination with an operating mechanism consisting in part of an electro-magnetic coil containing two or more separate windings which are connected to the said two or more of such circuits for aiding the current production when the machine is connected as a generator.

16. In an electric machine having two or more circuits, the connections or circuit relations of which may be varied, mechanism consisting in part of two cooperating electro-magnetic coils each of which contains two or more separate windings which are connected to two or more of such circuits.

17. In an electric machine having two or more circuits, the connections or circuit relations of which may be varied, a system of current control affecting such machine consisting in whole or part of two cooperating electro-magnetic coils or systems each of which has two or more separate windings so coupled to two or more of such circuits that while in one system the two aid each other, in the other system they oppose each other.

18. In an electric machine having two or more circuits, the connections or circuit relations of which may be varied, a system of current control affecting such machines consisting in whole or part of two cooperating electro-magnetic coils or systems each of which has two or more separate windings so coupled to two or more of such circuits that while in one system the two aid each other in the other system they oppose each other, a moving contact controlled by the magnetic coils, in combination with a catch also actuated by such coils.

19. In an electric machine having two or more circuits the connections or circuit relations of which may be varied, mechanism consisting in part of an electro-magnetic coil or system containing two or more separate windings, the circuits containing two or more make and break contacts one of which only is controlled by such electro-magnetic coil.

20. In an electric machine having two or more circuits, the connections or circuit relations of which may be varied mechanism consisting in part of an electro-magnetic coil or system containing two or more separate windings the circuits containing two or more make and break contacts one of which is controlled by such system in combination with a separate magnetic field-producing element upon or near which the contacts are located.

21. In an electric machine which is used alternately as a motor and generator by reversing the circuit relation of its field and armature the combination of separate mechanism consisting in part of electro-magnetic coils or system consisting of windings coupled respectively to the circuits of the field and armature whereby said mechanism may perform separate and differing functions as the machine is used respectively as a generator and motor.

CHARLES E. DAVIS.

Witnesses:
HENRY W. NAJDOWSKI,
GEO. C. PFEEFER.